INVENTORS.
John D. Ball,
Carl R. Wischmeyer,
BY Frank S. Troidl
ATTORNEY.

INVENTORS.
John D. Ball,
Carl R. Wischmeyer,
BY Frank S. Troidl
ATTORNEY.

INVENTORS.
John D. Ball,
Carl R. Wischmeyer,
BY Frank S. Troidl
ATTORNEY.

INVENTORS.
John D. Ball,
Carl R. Wischmeyer,
BY Frank S. Troidl
ATTORNEY.

INVENTORS.
John D. Ball,
BY Carl R. Wischmeyer,
Frank S. Troidl
ATTORNEY.

INVENTORS.
John D. Ball,
Carl R Wischmeyer,
BY Frank S. Troidl
ATTORNEY.

United States Patent Office 2,841,778
Patented July 1, 1958

2,841,778

GENERATION AND RECORDING OF DISPLACEMENT DEPENDENT MODULATED CARRIERS

John D. Ball and Carl R. Wischmeyer, Houston, Tex., assignors, by mesne assignments, to Esso Research and Engineering Company, Elizabeth, N. J., a corporation of Delaware Application September 26, 1955, Serial No. 536,420

5 Claims. (Cl. 340—18)

This invention relates to a new method of recording data which has displacement (depth or distance) as the independent variable without any dependence on time measurements. The method involves the generation of carrier signals and the modulation of said carrier signals by the data to be recorded as a function of displacement only. Upon recording on a suitable medium, the signals are reproducible with time as the analogue of distance.

Under some circumstances it is highly desirable that data be obtained as a function of depth such as a well logging signal derived from logging devices utilized in borehole investigation. It is also desirable that this data be recorded in such a manner that it is reproducible as an electrical signal correlated with depth. The necessity of preserving constant values of amplitude of the data places further requirements upon the system. A method of recording said data in a form such that it is reproducible as an electrical signal correlated to depth such that said signal can be used in automatic data processing or the reproduction of paper or film records for viewing purposes would also be of great value. Further, if such a system allows for a degree of independence from defects in the recording medium such as could be realized with modulated carrier systems, the value will be immediately apparent to those skilled in the art.

In its broadest aspect, our new system for recording electrical signals from a movable member correlated with displacement includes a means which is utilized to activate intermittently an electrical signal with each activation of the electrical signal being representative of a predetermined displacement of the movable member. Modulating means is provided in the new system which modulating means is designed to receive both the electrical signal from the movable member and the intermittent signal and to produce as an output a modulated signal, the intermittent signal being the carrier and the electrical signal from the movable member being the modulating signal. The modulated signals are recorded on a medium such that it may subsequently be reproduced with time as the analogue of displacement. The signals may then be demodulated and if desired re-recorded on a paper or film recording member which correlates the data received from the movable member with the distance traversed by said movable member.

In one of its more specific uses our new system may be utilized in well logging operations. When so utilized, the logging device is lowered into a borehole and signals representative of a physical characteristic of the subsurface formations traversed by the logging device are conducted to the surface of the earth. The logging device may be any form of logging device commonly utilized in well operations, such as the resistivity loggers, radiation loggers, caliper logs, or any other type of logging device. Means are connected to the lowering means adapted to activate intermittently an electric current to produce the intermittent signals with each activation of said current representing a predetermined change in depth of the logging device. Both the intermittent electrical signals and the signals from the logging device, which signals are representative of a physical characteristic of the subsurface formations, are conducted to a modulation system where the intermittent electrical signal generated as a function of depth is modulated by the signal from the logging device, and then recorded on a recording medium, such as magnetic tape. The traces thus recorded may be subsequently demodulated and re-recorded as demodulated signals on a separate recording means and correlated with depth.

Other objects and a fuller understanding of the invention may be had by reference to the following description and claims taken in conjunction with the accompanying drawings in which:

Figures 1, 2:
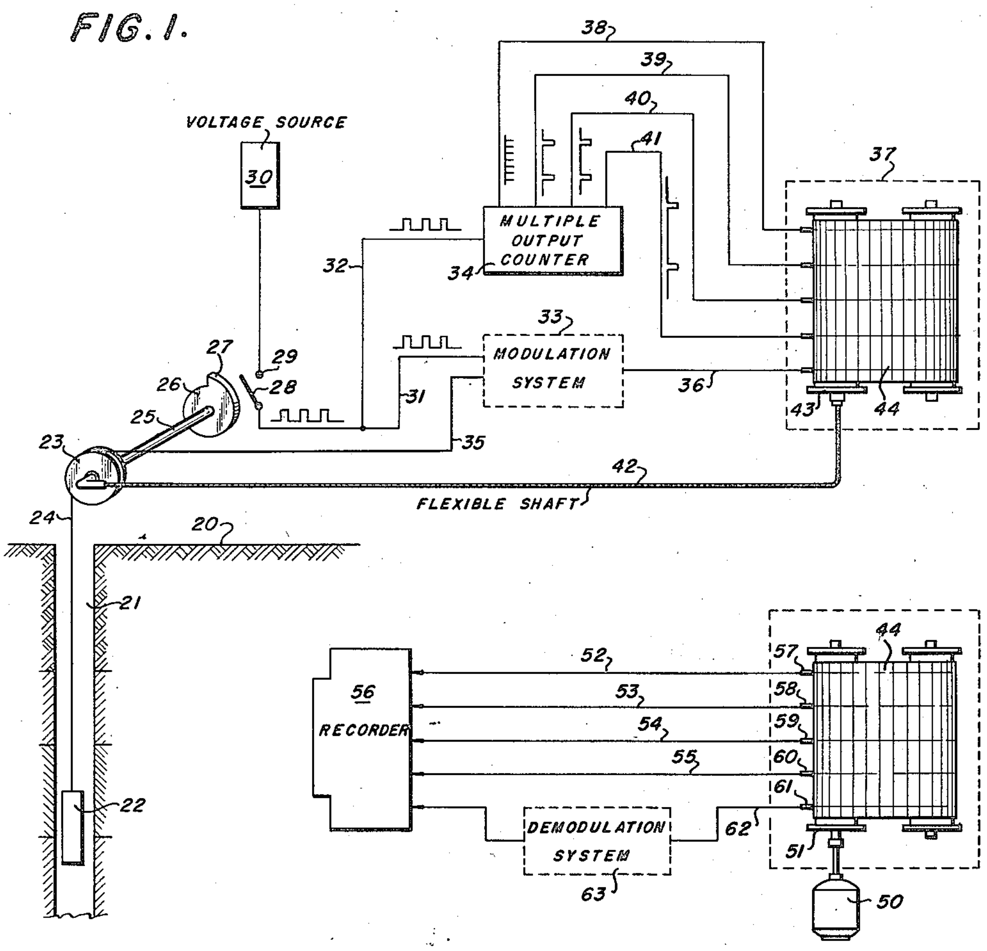
Fig. 1 is a diagrammatic representation of our new system when utilized in conjunction with a well logging device.
Fig. 2 is a diagrammatic view showing a re-recording system including a demodulation and depth correlation means which may be utilized to demodulate the recordings obtained by utilizing the system shown in Fig. 1.

Referring to Fig. 1, numeral 20 refers to the surface of the earth into which a borehole 21 has been drilled. A logging device 22, which is shown diagrammatically in block form, is lowered into the borehole 21 for the purpose of getting electrical indications representative of various physical characteristics of subsurface formations traversed by the logging device 22 as it is lowered or raised within borehole 21. The logging device 22 is moved by means of a sheave arrangement 23 about which a cable 24 containing various electrical conductors is wound. Connected to the sheave 23 is an electrical interrupter such as a shaft 25 which has arranged thereabout a cam member 26 which has a surface shown at 27 designed to cause the contact of an electric switch, such as a micro-switch 28 with a switch contact 29. It can be seen by examination of Fig. 1 that the micro-switch 28 is activated by cam 26 each time the cam rotates 360 degrees, which rotation is equivalent to one complete rotation of the sheave 23 with each rotation of sheave 23 lowering the logging device 22 an equal distance. Hence each time the cam 26 activates the micro-switch 28, the logging device 22 has been moved a predetermined distance with each movement of the logging device 22 being equal in distance. Therefore, if for any reason the sheave 23 is not rotated at a constant rate of speed, each successive activation of the micro-switch 28 still represents an equal displacement of logging device 22 even though the time interval between each successive activation may vary. Therefore, it can be seen a means is provided for generating an intermittent electrical signal which is non-dependent upon time and is entirely representative of the displacement of a movable member.

Upon each activation of the micro-switch 28, the micro-switch 28 is made to contact the electric contact 29 and a pulse is conducted by means of a voltage source 30 through conductors 31 and 32. Voltage source 30 may be a battery or a regulated power supply. The pulses conducted through conductor 31 and the pulses conducted through conductor 32 are fed to a modulation system 33 (such as described hereinafter) and a multiple output counter 34, respectively. Suitable multiple output counters for use with this invention are described in the text "Electronics," by Elmore and Sands (McGraw-Hill, 1949), chapter 4. A second electrical conducting means 35 is also provided to feed an input signal to the modulation system 33 which electrical signal is obtained from the logging device 22. The modulated output of the modulation system 33 is conducted through conductor 36 to a recording means 37. This recording means may, for example, be a magnetic tape recorder, which tape is magnetized to an intensity of magnetization which is proportional to the amplitude of the electrical signals imposed upon a magnetic head utilized to magnetize the tape.

The multiple output counter has a series of conductors 38 through 41, inclusive, with each conductor being utilized to conduct pulses representing various intervals in feet traversed by the logging device 22. For example, the output from the multiple output counter 34 which is conducted through conductor 38 may produce a mark upon the resultant record which is indicative of a movement of one foot of the logging device 22. The pulses from the output counter 34 conducted through conductor 39 may represent a ten-foot interval, the output from the counter conducted through conductor 40 a hundred-foot interval, and the output from the counter conducted through conductor 41 a thousand-foot interval.

A mechanical coupling shaft 42 is provided to interconnect the central axis of the rotatable sheave 23 with the central axis of a wheel 43 utilized to wind the magnetic tape 44. Hence the movement of the magnetic tape 44 is made to correspond with the movement of the sheave member 23.

Referring to Fig. 2, one type of re-recording system is shown. The magnetic tape 44 which contains the records obtained from the system of Fig. 1 is rotated by means of a constant speed motor 50 which is connected to a reel 51 of the magnetic tape 44. The depth indications obtained from the multiple output counter 34 are conducted through conductors 52 through 55 and recorded on recorder 56. The signals which are conducted through conductors 52 through 55 are detected by means of magnetic detecting heads 57 through 60, respectively. These magnetic detecting heads detect the magnetization on the recording tape 44 and produce currents which are representative of the magnetization on tape 44. The trace on magnetic tape 44, which was obtained from the modulation system 33, is detected by means of a magnetic head 61 and conducted through conductor 62 to a demodulation system 63 (such as described hereinafter) and the demodulated signal, which is the data obtained from the logging device 22 is recorded on recorder 56.

Figure 3:
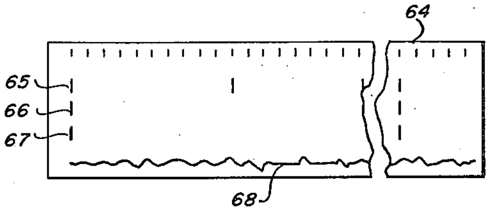
Fig. 3 shows a resultant record obtained by the systems shown in Figs. 1 and 2.

Fig. 3 shows the record which is obtained from the systems described in Figs. 1 and 2. As shown in Fig. 3, the lines 64 each represent an increment of one foot, the lines 65 an increment of 10 feet, lines 66 an increment of 100 feet, lines 67 an increment of 1000 feet and the trace 68 shows the data obtained from the logging device 22. Hence it can be seen that the data obtained from logging device 22 is easily correlatable with the depth of the logging device 22.

Figure 4:
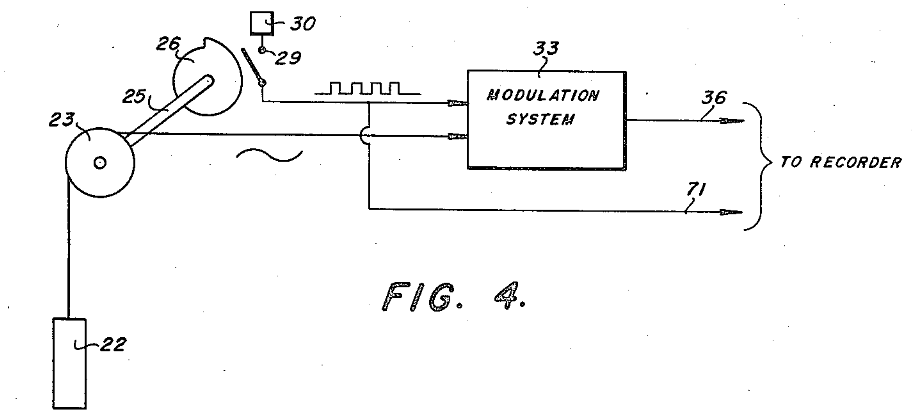
Fig. 4 shows a second type of system which may be utilized with a logging device.
Figure 5:
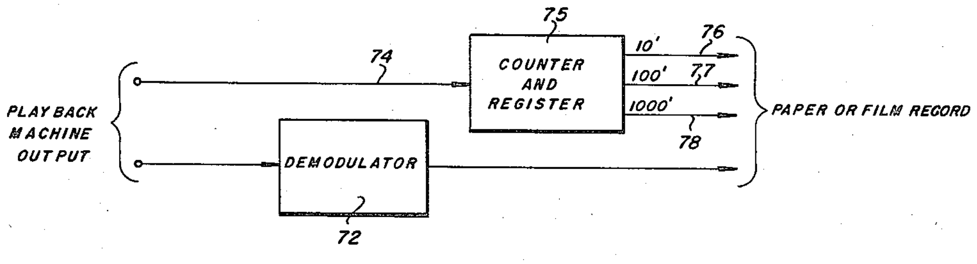
Fig. 5 shows a type of re-recording system which includes both a demodulation and depth correlation means which may be utilized in conjunction with the modulation system shown in Fig. 4.
Figure 6:
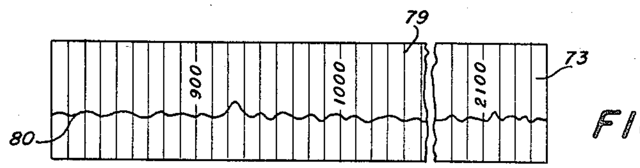
Fig. 6 shows the type of record which is obtained by the system shown in Fig. 5.

Figs. 4, 5 and 6 represent a second type of system which may be utilized in carrying out our new method of non-time dependent tape recording. As shown in Fig. 4, the intermittent currents resulting from the intermittent activation of the micro-switch 28 is fed directly to the recorder by means of electrical conductor 71. The intermittent signals and the electric signals from the logging device are both conducted to the modulation system 33 in the same manner as shown in Fig. 1, and the modulated signal from the modulation system 33 is conducted through conductor 36 and registered on the tape of the recorder. As shown in Fig. 5, upon "playback" the modulated signal is conducted to a demodulator 72 and the data is recorded on a paper or film record. The detected intermittent signal is conducted by means of conductor 74 to a counter and registering means 75 which counter and registering means 75 which counter and registering means (such as described in chapter 4 of "Electronics," supra) produces pulses through conductors 76, 77 and 78 which are representative of 10 feet, 100 feet and 1000 feet incremental displacements, respectively. As shown in Fig. 6, the vertical lines 79 represent ten-foot intervals. The data shown by trace 80 is superimposed on the depth lines and hence correlatable with the depth of the logging device 22.

Figure 7:
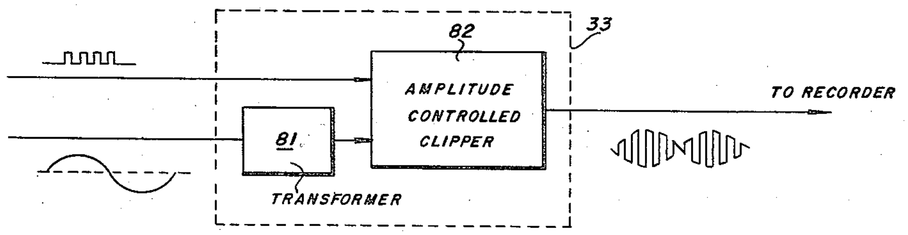
Fig. 7 shows one type of modulation which may be utilized in either of the systems shown in Fig. 1 and Fig. 4.

Fig. 7 shows in block diagram one type of modulation system which may be utilized in practicing our new invention. As shown in Fig. 7 in block diagram, the modulation system 33 consists of a transformer 81 and an amplitude controlled clipper 82. The amplitude controlled clipper may assume the form of a diode modulator such as described in "Radio Engineers Handbook," by F. E. Terman (1943) 1st ed., section 7, par. 8. The intermittent signals generated when the micro-switch 28 is activated are conducted to the amplitude controlled clipper 82. The signal from the logging device is also fed to the amplitude controlled clipper 82 after passing through transformer 81 where the signal controls the level of the intermittent signals passing from the clipper and a modulated signal is fed out of the amplitude controlled clipper and conducted to the recording means.

Figure 8:
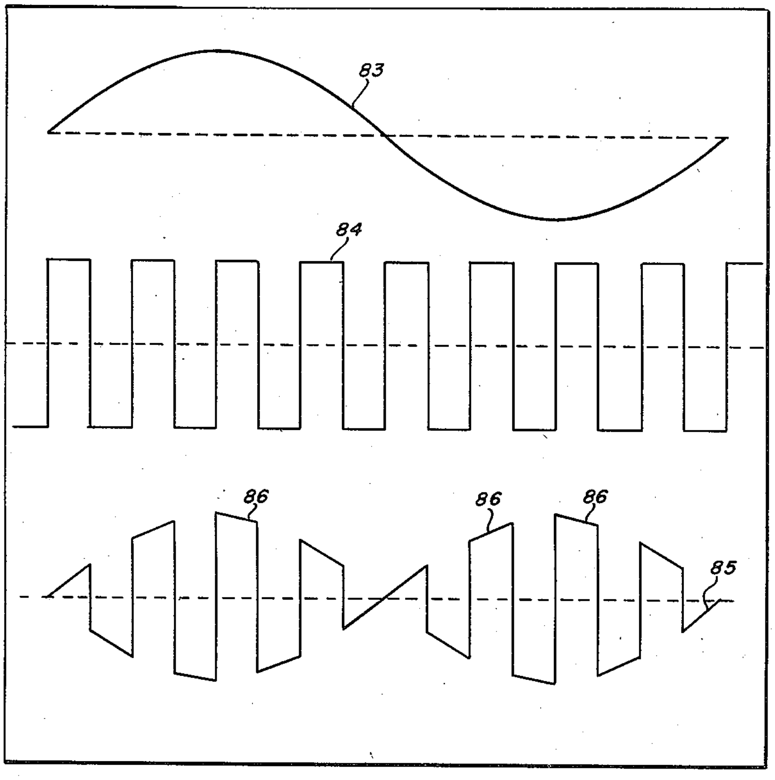
Fig. 8 is a graphical representation designed to explain the operation of the modulating system shown in Fig. 7.

Fig. 8 is a graphical representation which is shown only for the purpose of explaining the manner of operation of the modulation system shown in Fig. 7. For purposes of clarity and ease of explanation, the signal from the logging device is shown as a sine wave. It is to be understood, however, that the use of a sine wave is only for purposes of explanation and that in actuality the signals from the logging device will not be a sine wave but may be any type of signal or wave form. However, the modulation system will operate in the same manner upon any signal derived from the logging device 22.

The graph shown in Fig. 8 shows the amplitude of the signals as the ordinate and distance traversed by the logging device 22 as the abscissa. As shown in Fig. 8, the signal from the logging device is represented by the wave 83. The intermittent pulses generated by means of the closing of the micro-switch 28 are shown by rectangular waves 84. Signal 83 is passed through the transformer 81 which transformer is center tapped to cause the generation from the secondary winding of the transformer of two sine waves which are 180 degrees out of phase with one another. The modulated signal which is conducted from the amplitude control clipper 82 to the recorder is shown by the trace 85 of Fig. 8. It can be seen from an examination of Fig. 8 that the magnitudes of the pulses 86 of trace 85 are proportional to the instantaneous magnitudes of the wave 83. It is to be emphasized again that the abscissa shown in Fig. 8 is representative of distance and not time. Hence the pulses 84 are shown equally spaced in equal intervals of distance even though the time interval required for each of the pulses 84 to be generated may not be equal in time.

Figure 9:
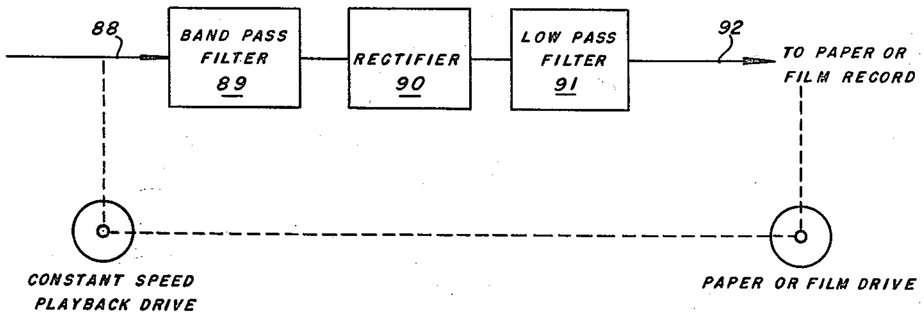
Fig. 9 shows a demodulation system which can be utilized to demodulate signals obtained using the system of Fig. 7.

Fig. 9 shows a demodulating system which is utilized to demodulate the modulated signal shown at 85 in Fig. 8. The recorded traces obtained by the modulation system shown in Fig. 7 are placed upon a constant speed playback drive for purposes of recording the data on a paper or film recorder. The frequency $f_c$ of the carrier signal conducted through conductor 88 is equal to the number of pulses 84 per inch of magnetic tape times the inches per second of the tape in playback speed. The modulated signal conducted through conductor 88 is first passed through a band pass filter 89 whose pass band includes $f_c$ and adjacent frequencies. The filtered signal is conducted to a rectifier 90 then through a low pass filter 91 which is designed to pass signals of frequency less than $f_c$, and then to the paper or film recorder 92. The apparatus shown in Fig. 9 is of conventional design, a prior art embodiment of a similar demodulator being shown in F. E. Terman's "Radio Engineers Handbook" (1945), section 7, par. 9.

Figure 10:
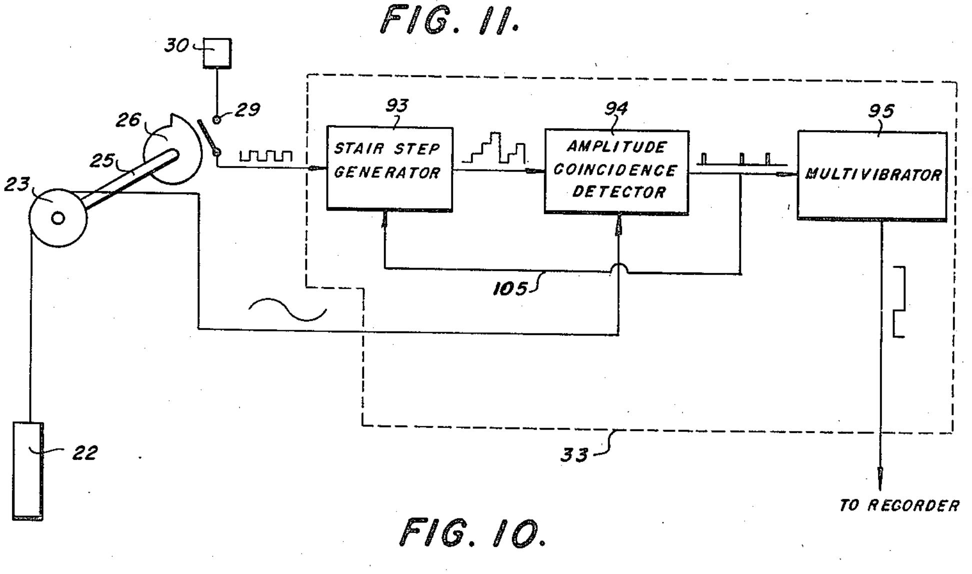
Fig. 10 shows in block diagram a second type of modulating system.

Fig. 10 shows a second type of modulation system which may be utilized in carrying out our new invention. The modulation system of Fig. 10 consists of a stair-step generator 93, which may be a device such as used in the model E1T decade counter, manufactured by Ampex Electronic Company, Hicksville, Long Island, N. Y.; an amplitude coincidence detector 94, which may assume the form of a Schmitt trigger circuit such as described on page 99 of the text "Electronics," supra, wherein the control grids of the triggered tubes are fed signals, and an output pulse is obtained when the two grids are at the same voltage level; and a multivibrator 95. The multivibrator 95 is an Eccles-Jordan type multivibrator or "flip-flop" system. The intermittent signals are fed to the stair-step generator 93, the output of which is a stepwise increase in voltage proportional to the number of pulses received. The output of the stair-step generator 93 is fed to the amplitude coincidence detector 94. The signal from the logging device 22 is also fed to the amplitude coincidence detector 94. The output of the amplitude coincidence detector 94 consists of a series of pulses, with each pulse being generated from the amplitude coincidence detector each time the magnitudes of the signal from the logging device 22 and the signal from the stair-step generator 93 coincide. The pulses from the amplitude coincidence detector 94 are fed to the "flip-flop" circuit 95, which "flip-flop" circuit generates rectangular pulses, the width of each pulse being proportional to the amplitude of the signal generated by the well logging device. Each of the pulses from amplitude coincidence detector 94 are also fed to the stair-step generator 93 by means of conductor 105 with each pulse serving to reset the stair-step generator 93.

Figure 11:
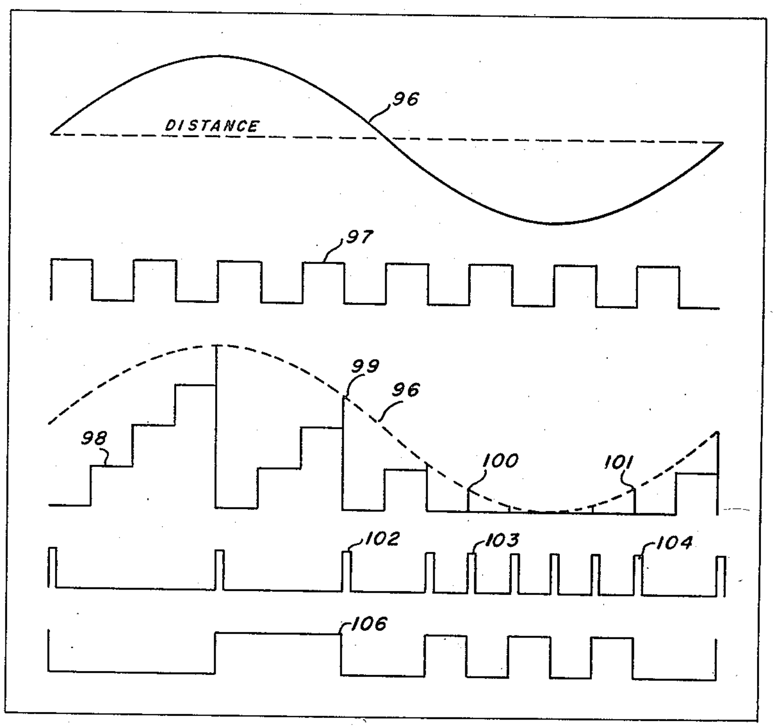
Fig. 11 is a graphical representation designed to illustrate the action of the modulating system shown in Fig. 10.

The operation of the modulating system shown in Fig. 10 is illustrated in graphical form in Fig. 11 utilizing a sine wave as the signal from the logging device. Here again it is to be emphasized that the since wave is used only for purposes of explanation and it is to be understood the actual signal from logging device 22 will probably not be a sine wave. As shown in Fig. 11, the sine wave is represented by numeral 96 and the intermittent pulses by numeral 97. As each pulse 97 is fed into the stair-step generator, the voltage of the output of the stair-step generator increases stepwise as shown by the steps represented by numeral 98. When the amplitude of the steps 98 and the signal from the logging device 96 coincide, such as at 99, 100, and 101, a pulse is generated from amplitude coincidence detector 94, such as the pulses shown by 102, 103, and 104, which are generated as a result of the coincidence of the magnitudes of the stair-step generator output and the logging device signal shown at 99, 100 and 101, respectively. Each pulse from amplitude coincidence detector 94 operates to turn the flip-flop system 95 on or off, depending upon the previous condition of the flip-flop circuit 95. If the flip-flop circuit 95 is on, the first pulse from amplitude coincidence detector 94 will flip the circuit off, the next pulse will flip the circuit on, etc. The shorter the distance between successive pulses from the amplitude coincidence detector 94, the smaller in width the rectangular pulses 106 of the output signal from the flip-flop circuit 95 will be.

Figure 12:
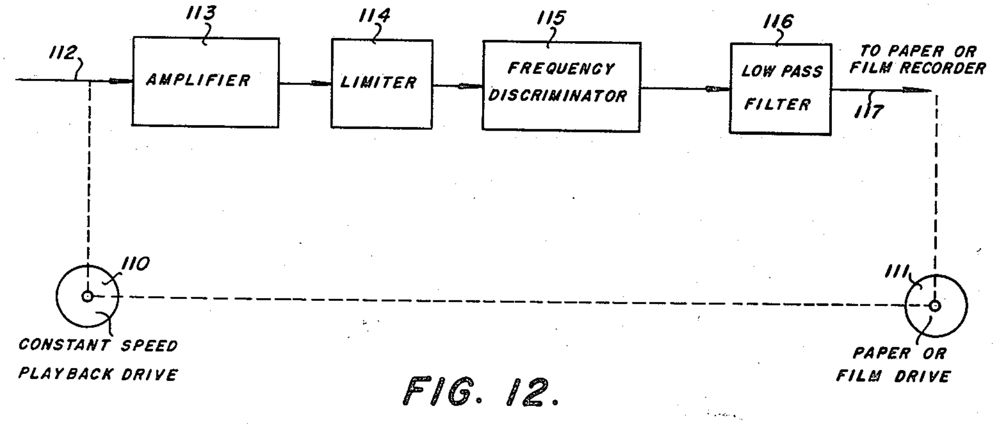
Fig. 12 shows a demodulation system which is utilized to demodulate signals obtained utilizing the system of Fig. 10.

Fig. 12 shows a re-recording system suitable for use with the modulation system shown in Fig. 10. As shown in Fig. 12, the record is played back and recorded on a paper or film recorder by means of a constant speed playback drive 110 and paper or film drive 111 which are interconnected. The frequency of the carrier generated through conductor 112 is equal to $f_c$=(samples per inch tape with no signal)×(inches per second playback speed). The modulated carrier signal is fed to an amplifier 113, a limiter 114 and a frequency discriminator 115, the center frequency of the frequency discriminator being equal to $f_c$. The signal from the frequency discriminator 115 is conducted through a low pass filter 116 whose cut-off frequency is equal to $f_c$. The resulting demodulated signal is conducted through conductor 117 to the paper or film recorder. A demodulator system similar to that shown in Fig. 12 may be found at page 585 of Terman's "Radio Engineers Handbook," supra.

Figure 13:
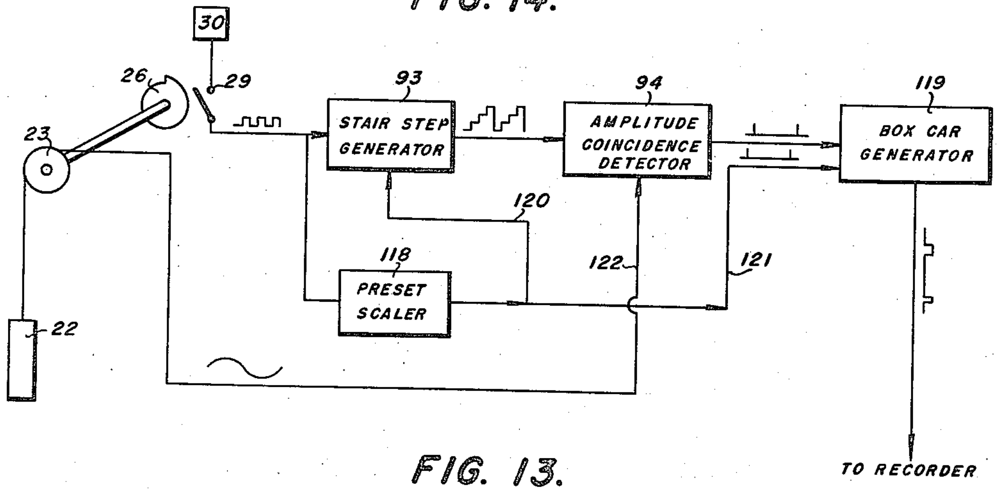
Fig. 13 shows in block diagram a third type of modulating system.

Fig. 13 shows a third type of modulation system which may be utilized in our new non-time dependent logging system. The system shown in Fig. 13 has a stair-step generator 93 and an amplitude coincidence detector 94 similar to the generator and detector shown in Fig. 10. Included in the system of Fig. 13, however, is a pre-set scaler 118 (such as described at pages 208–212 of the text "Electronics," by Elmore and Sands, supra) and a box car generator 119 (a bistable Eccles-Jordan multivibrator having two control circuits respectively controlling the two stable conditions). The intermittent signal generated as a result of the activation of the micro-switch 28 is fed to the stair-step generator 93 and also fed to the pre-set scaler 118. The pre-set scaler 118 is designed to send a pulse through conductor 120 after a predetermined number of intermittent pulses have been received by the pre-set scaler 118. The pulses conducted to stair-step generator 93 through conductor 120 operate to reset generator 93. The pulses from pre-set scaler 118 are also fed through conductor 121 to the box car generator 119. Signals received from the logging device 22 are conducted through conductor 122 to amplitude coincidence detector 94. When the amplitudes of the stair-step generator and the signal from logging device 22 coincide in magnitude, a pulse is generated from amplitude coincidence detector 94. Both the pulses from coincidence detector 94 and the pulses from pre-set scaler 118 are conducted to the box car generator 119, with the pulses from the pre-set scaler 118 serving to turn the box car generator on and the pulses from amplitude coincidence detector serving to turn the box car generator off. Hence it can be seen that the rectangular waves generated from box car generator 119 are proportional in width to the amplitude of the signals from logging device 22.

Figure 14:
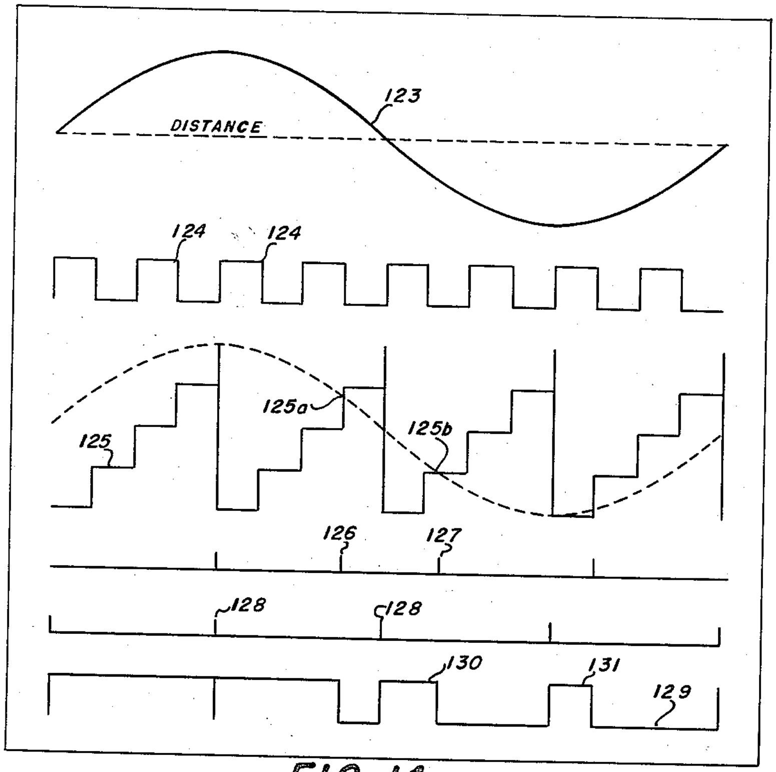
Fig. 14 is a graphical representation designed to illustrate the action of the modulating system of Fig. 13.

Fig. 14 illustrates in graphical form the operation of the modulation system of Fig. 13. The signal from the logging device is shown at 123 and the intermittent pulses from the microswitch system are represented by 124. The stair step signals 125 coincide in magnitude to the signal 123 from the logging device 22 at various points, such as 125*a* and 125*b*. At these coincidence points the amplitude coincidence detector 94 produces pulses such as shown at 126 and 127 respectively. These pulses are conducted to the box car generator 119. Also after a predetermined number of pulses 124 have been received by preset scaler 118, a pulse is generated from preset scaler 118, such as shown at 128 in Fig. 14 which pulses are conducted to box car generator 119 to turn the box car generator on and which pulses are also conducted to the stair-step generator 93 to reset said stair-step generator. The signal generated from box car generator 119 is shown at 129 in Fig. 13 and it can be seen that the width of the rectangular waves such as shown at 130 and 131 are proportional to the amplitudes of the signal from logging device 22.

Figure 15:
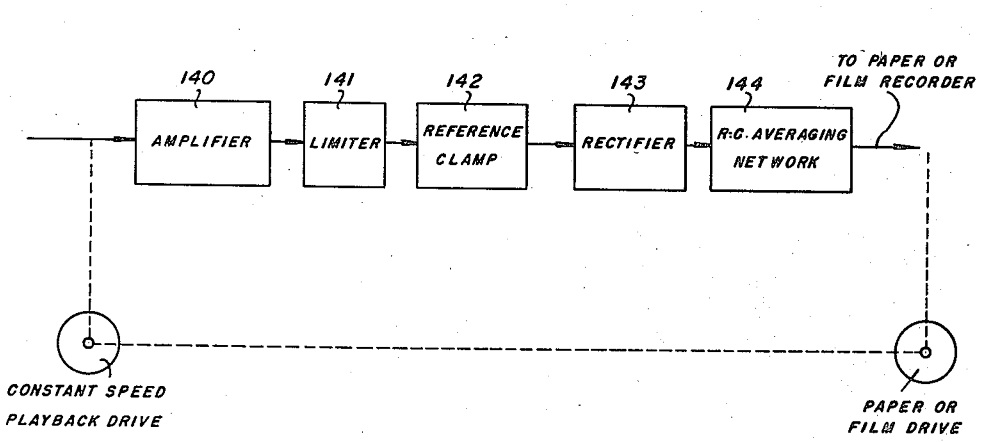
Fig. 15 shows in block diagram a demodulation system utilized for demodulating the signals obtained from the modulating system of Fig. 13.

Fig. 15 shows a demodulation system suitable for use in demodulating the signals obtained from the modulation system of Fig. 13. The modulated signal is fed through an amplifier 140 and a limiter 141 (similar to that described in Terman's "Radio Engineers Handbook," supra, pp. 668–670), a reference clamp 142 (see "Principles of Radar," by M. I. T. Radar School Staff, 2nd ed., pp. 2–37), a half-wave rectifier 143 (see Terman's "Radio Engineers Handbook," supra, pp. 553–563) and an RC averaging network 144 (see the text "Electronics Circuits and Tubes," by Cruft Electronics Staff (McGraw-Hill 1947), p. 831). The averaging network 144 has a time constant T equal to RC which is equal to $1/f_0$ where $f_0$ is equal to [(the number of pulses per inch of tape)÷(the scaler constant)]×(inches per second of playback speed).

Although we have described our new non-time dependent modulating system with reference to its use with a logging system, we do not wish to be restricted to such use. Our new non-time dependent modulating system is equally utilizable with any type of system wherein it is desired to correlate the distance of a movable member from which a signal is being received with the data obtained from said signal.

Although we have described our invention with a certain degree of particularity, it is understood that the present disclosure has been made only by way of example and that numerous changes in the details of construction and the combination and arrangement of parts may be resorted to without departing from the spirit and the scope of the invention as hereinafter claimed.

What we wish to claim as new and useful is:

1. In a well logging system: means for lowering into a borehole a logging device adapted to produce first electrical signals representative of a physical characteristic of the earth formations traversed by said borehole; electrical conducting means connected to said logging device for conducting said electrical signals to the surface of the earth; means connected to said lowering means adapted to intermittently activate an electric current thereby producing intermittent signals, each activation of said current representing a predetermined displacement of said logging device; circuit means for modifying a characteristic of said intermittent signals in accordance with the amplitude of said first electrical signals; a recorder; and electrical conducting means interconnecting said circuit means and said recorder, said electrical conducting means serving to conduct the modulated signals to said recorder.

2. A well logging system in accordance with claim 1 wherein said modulating means includes: an amplitude controlled clipper for varying the amplitude of said intermittent signals in accordance with the amplitude of said first electrical signals.

3. A well logging system in accordance with claim 1 wherein said modulating means includes: a stair-step generator adapted to receive said intermittent signals and produce stair-step signals; an amplitude coincidence detector into which both the stair-step signals and the electrical signals from said logging device are fed, said amplitude coincidence detector serving to produce an output pulse each time the instantaneous magnitudes of said stair-step signals and said electrical signals from said logging device coincide; means for feeding said output pulses to said stair-step generator to reset said generator each time a pulse is received by said generator; a bi-stable multivibrator into which the output pulses from said amplitude coincidence detector are also fed, the voltage output of said bi-stable multivibrator being changed from one output voltage to the other output voltage by each succeeding pulse from said amplitude coincidence detector, thereby producing signals which are in width proportional to the amplitude of the signal generated by said well logging device.

4. A well logging system in accordance with claim 1 wherein said modulating means includes: a stair-step generator adapted to receive said intermittent signals and produce stair-step signals; a scaler electrically interconnecting said intermittent current generating means and said stair-step generator adapted to reset said stair-step generator after a predetermined number of intermittent signals have been received by said stair-step generator; an amplitude coincidence detector adapted to receive both the stair-step signals from said stair-step generator and the electrical signals from said logging device, said amplitude coincidence detector serving to produce an output pulse each time the magnitudes of said stair-step signals and said signals from the logging device coincide; a rectangular wave generator; electrical conducting means interconnecting said scaler and said rectangular wave generator; and electrical conducting means interconnecting said amplitude coincidence detector and said rectangular wave generator, said rectangular wave generator being turned on by each pulse received from said scaler and turned off by each pulse received from said amplitude coincidence detector, thereby producing rectangular waves of duration proportional to the amplitudes of said electrical signals from said logging device.

5. In a well logging system: means for lowering into a borehole a logging device adapted to produce first electrical signals representative of a physical characteristic of earth formations traversed by said borehole; electrical conducting means connected to said logging device for conducting said electrical signals to the surface of the earth; means connected to said lowering means adapted to intermittently activate an electric current thereby producing intermittent signals indicative of said lowering device, each activation of said current indicating a predetermined displacement of said logging device; a stair-step generator adapted to receive said intermittent signals and produce stair-step signals; an amplitude coincidence detector for producing an output pulse upon coincidence of the amplitude of said stair-step signals and said electric signals from said logging device; means for resetting said stair-step generator after production of an output pulse thereby; a bi-stable multivibrator means for producing output signals having a characteristic variable in accordance with the spacing between output signals of said amplitude coincidence detector.

References Cited in the file of this patent

UNITED STATES PATENTS

| | | |
|---|---|---|
| 2,197,571 | Millington et al. | Apr. 16, 1940 |
| 2,466,804 | Giffen et al. | Apr. 12, 1949 |
| 2,592,737 | Renolds et al. | Apr. 15, 1952 |
| 2,676,314 | Wallace | Apr. 20, 1954 |
| 2,704,364 | Summers | Mar. 14, 1955 |